United States Patent [19]
Odom et al.

[11] Patent Number: 5,850,571
[45] Date of Patent: Dec. 15, 1998

[54] SYSTEM AND METHOD FOR CONVERTING READ CYCLES INTO WRITE CYCLES FOR IMPROVED SYSTEM PERFORMANCE

[75] Inventors: Brian K. Odom, Pflugerville, Tex.; Nigel D. Waites, Santa Clara, Calif.; Pratik M. Mehta; Bob Mitchell, both of Austin, Tex.; Robert W. Canik, Cedar Park, Tex.

[73] Assignee: National Instruments Corporation, Austin, Tex.

[21] Appl. No.: 635,688

[22] Filed: Apr. 22, 1996

[51] Int. Cl.$^6$ ..................................................... G06F 13/00
[52] U.S. Cl. .......................... 395/847; 395/825; 395/885; 395/306; 395/281; 395/309
[58] Field of Search ................... 395/306–311, 280–283, 395/821–827, 882–888, 842–855

[56] References Cited

U.S. PATENT DOCUMENTS

| | | | |
|---|---|---|---|
| 5,287,457 | 2/1994 | Arimilli et al. | 395/308 |
| 5,566,306 | 10/1996 | Ishida | 395/309 |
| 5,619,728 | 4/1997 | Jones et al. | 395/847 |
| 5,621,902 | 4/1997 | Cases et al. | 395/309 |
| 5,642,489 | 6/1997 | Bland et al. | 395/308 |
| 5,655,151 | 8/1997 | Bowes et al. | 395/842 |
| 5,659,696 | 8/1997 | Amini et al. | 711/202 |
| 5,659,749 | 8/1997 | Mitchell et al. | 395/678 |
| 5,664,092 | 9/1997 | Waites | 395/183.01 |
| 5,664,117 | 9/1997 | Shah et al. | 395/280 |
| 5,664,142 | 9/1997 | Boldt et al. | 711/112 |
| 5,678,063 | 10/1997 | Odom et al. | 395/842 |
| 5,692,211 | 11/1997 | Gulick et al. | 395/800.35 |
| 5,694,333 | 12/1997 | Andrade et al. | 364/514 |
| 5,708,779 | 1/1998 | Graziano et al. | 395/200.8 |
| 5,721,839 | 2/1998 | Callison et al. | 395/308 |

*Primary Examiner*—Christopher B. Shin
*Attorney, Agent, or Firm*—Conley, Rose & Tayon; Jeffrey C. Hood

[57] ABSTRACT

A system and method for increasing the performance of read cycles in instrumentation systems having multiple interconnected buses by converting the read cycles into write cycles and taking advantage of the write posting and FIFO buffering capabilities of the bus interface logic between each of the interconnected buses. When a requestor device desires to initiate a read cycle of memory situated on the same or a different bus, the requestor device first creates a data transfer packet containing information about the desired data. The requestor device then generates a write cycle to DMA logic situated near the memory desired to be read. The DMA logic uses the 32 bit address provided from the requestor device, to obtain information about the transfer and then initiates DMA write cycles to perform the desired transfer. Since each bus interface bridge includes write posting capability, the write operation can be performed much more efficiently than a read operation. The write posting capability requires that only (one) bus be tied up at a given time, and thus write cycles perform much more efficiently. The present invention is also capable of operating in either direction.

26 Claims, 8 Drawing Sheets

| VXIbus Source Address (starting address of the data before the transfer) | | | | |
|---|---|---|---|---|
| VXIbus Destination Address (starting address of the data after the transfer) | | | | |
| Transfer Count (number of bytes to be transferred) | | | | |
| MCR bits (no Port Select or Request Size bits needed) | | | | |
| DCR bits (no Port Select or Request Size Bits needed) | | | | |
| A16 Addr for Ack (16 bits) This is where the DMA logic will write the Ack_Pkt | Update Xfer_Pkt (1bit) 0=No 1=Yes | LocMon Ack Type (2bits) 00=16-bit LocMon 01=8-bit LocMon 10=SignalRegister 11=No LocMon (Poll for ack) | Only Ack Errors (1 bit) The DMA logic sends ack only if an error occurred in the transfer. | Request_Num/ LocMon Val (12 bits) Used to keep track of DMA requests. These should be in sequence to ease error recovery. |
| Transfer Count at Error | | | | |
| CSR bits (copy of the DMA logic Channel Status Register) | | | | |
| Optional Device Specific Xfer_Pkt Information (up to 32 bytes) | | | | |

FIG. 8

| 31      6 | 5     4 | 3             2 | 1 | 0 |
|---|---|---|---|---|
| VXI Address of the Xfer_Pkt (26 bits) | Rsvd (00) | VXI Addr Space of the Xfer_Pkt 00=A32 space 11=A24 space 10=A16 space (Assumed always to be Supervisory Data) | Data Width of Xfer_Pkt 0=32bits 1=16bits | Mode to read the Xfer_Pkt 0=Normal 1=VXI Block mode |

FIG. 9

| 15 | 14 3 | 2 0 |
|---|---|---|
| Error | Request_Num / LonMon Val (11:0) | Rsvd (000) |

Acknowledge to a 16-bit location monitor

FIG. 10

| 15 8 | 7 0 |
|---|---|
| Request_Num / LonMon Val (7:0) | DMA Logic's Logical Address |

Acknowledge to a Signal Register

FIG. 11

| 7 0 |
|---|
| Request_Num / LonMon Val (7:0) |

Acknowledge to a 8-bit location monitor

FIG. 12 sulación# SYSTEM AND METHOD FOR CONVERTING READ CYCLES INTO WRITE CYCLES FOR IMPROVED SYSTEM PERFORMANCE

FIELD OF THE INVENTION

The present invention relates to increasing the performance of read cycles in systems having multiple interconnected buses, and more particularly to a method and apparatus for converting read cycles into write cycles to take advantage of the write posting capability of bus interface logic between each of the interconnected buses.

DESCRIPTION OF THE RELATED ART

Modern computer systems are evolving toward systems with a plurality of interconnected buses used to connect the various components. For example, a modern computer system will typically include a memory bus for connecting the CPU to main memory, a CPU local bus such as the PCI (Peripheral Component Interconnect) bus or the VL bus for peripherals such as video cards, etc., and a second input/output (I/O) expansion bus for compatibility with older expansion cards. Examples of older I/O expansion buses include the AT bus, referred to as the Industry Standard Architecture (ISA) bus, the EISA (Extended Industry Standard Architecture) bus, or the MCA (Microchannel Architecture) bus, among others. Due to the fact that different bus specifications are used by each of these respective buses, bus interface logic or bridge logic is required to interconnect the various different buses. For example, PCI bridge logic is necessary to connect the CPU local bus to the PCI bus, and bus controller logic is required to connect the computer's memory bus to the expansion bus.

Modern computer controlled instrumentation systems also typically include a plurality of interconnected buses to connect the computer to the various instruments and transducers. One popular bus interface option that is currently used in instrumentation systems is the VXI bus. The VXI (VME extension for Instrumentation) bus is a platform for instrumentation systems that was first introduced in 1987 and was designed as an extension of the VME bus standard. The VXI bus standard has experienced tremendous growth and acceptance around the world and is used in a wide variety of traditional test and measurement and ATE (automated test executive) applications. The VXI standard uses a mainframe chassis with a plurality of slots to hold modular instruments on plug-in boards. The modular instruments are inserted as cards into the VXI mainframe chassis, and these instruments acquire raw data and perform data processing in a similar manner to their predecessor stand-alone instruments.

Two methods that are used to control VXI instruments are to use either embedded VXI computers or to use a general purpose external computer. An embedded VXI computer is inserted as a plug-in card directly into the VXI mainframe. This control option offers the smallest physical size for a VXI system and also provides a direct connection so that the computer can take full advantage of the VXI high-performance backplane capabilities. When an external general purpose computer is used to control VXI instruments, a MXI bus cable is often used to connect the external computer to the VXI backplane. The MXI bus is a general purpose 32 bit multimaster system bus implemented on a cable that uses a hardware memory-mapped communications scheme to minimize software overhead. MXI devices can directly access each other's resources by performing simple reads and writes to appropriate address locations. MXI bus signals include 32 multiplexed address and data lines with parity, address modifiers for multiple address spaces, a single level multimaster prioritized bus arbitration, a single interrupt line, a bus error line for handling timeouts and deadlock conditions, and handshake lines for asynchronous operation. The MXI bus enables the external computer to operate as though it were installed directly in the VXI mainframe using the same direct VXI control capabilities as an embedded VXI computer.

When a MXI bus cable is used to connect an external computer to a VXI mainframe, a MXI interface card is installed in both the computer and the VXI mainframe, and the MXI cable connects the two interfaces together. The MXI interface card in the computer is generally an expansion bus/MXI interface card which interfaces between the expansion bus of the computer and the MXI bus cable. The MXI interface card installed in the VXI mainframe, referred to as a VXI-MXI extender, includes both a MXI interface and a VXI interface. The MXI interface interfaces with the MXI cable, while the VXI interface interfaces to the VXI backplane. The VXI-MXI extender also can serve as a general purpose VXI bus mainframe extender, allowing additional VXI mainframes to be added simply by connecting them together using MXI cables to connect respective VXI-MXI extenders installed in the additional VXI mainframes.

Therefore, a modern VXI based instrumentation system typically includes a general purpose computer with an expansion/MXI interface card that is connected through a MXI cable to a VXI-MXI extender inserted into a VXI mainframe. The MXI interface card converts expansion bus signals from the external computer to the MXI bus, and the VXI-MXI extender converts the MXI signals to VXI signals to control various VXI instruments in the VXI mainframe. In addition, the VXI-MXI extender can be used as a mainframe extender to daisy-chain multiple VXI mainframes together, wherein the VXI mainframes are controlled by the external computer. Modern VXI based instrumentation systems also include one or more interconnected VXI mainframes, wherein the VXI mainframes are controlled by an embedded computer in one of the mainframes.

In many instances, a VXI instrument card in a VXI mainframe is required to read memory locations in an external computer or in an embedded computer in a respective mainframe. In a system with an external computer, such a read operation requires the VXI instrument to arbitrate for control of the VXI bus, and once ownership of that bus is achieved, the VXI-MXI extender arbitrates for control of the MXI bus. Once ownership of the MXI bus is achieved, the expansion/MXI card then arbitrates for the expansion bus in the computer system. If the memory desired to be read is situated on the expansion bus, the read cycles are performed to transfer the data from the memory on the expansion bus to the VXI instrument in the VXI mainframe. All of the various buses, i.e., the expansion bus, MXI bus and VXI bus, are tied up during these read cycles and cannot be used for other operations until the entire read operation completes. If the memory desired to be read is not situated on the expansion bus, but rather is situated in main memory, then further arbitration typically is required for the memory bus, and the read cycles require an even greater amount of time to occur. Likewise, when the CPU in the external computer desires to read memory locations in a VXI instrument, arbitration of each of the buses between the CPU and the VXI instrument is required, and all of these buses are tied up during the entire read operation. Similar inefficiencies occur in VXI systems with embedded computers.

Therefore, in VXI based instrumentation systems, during read cycles no other meaningful operations can occur on any of the buses that are positioned between the device generating the read cycle and the memory servicing the read cycle. If a large amount of data is being transferred in the read operation, which is very common in instrumentation systems, then these buses cannot be used by other cycles for a lengthy period of time. This is especially problematic if the read operation involves the external computer's memory bus because the memory bus is tied up during the entire read operation as the read data propagates from bus to bus until it reaches its destination, and thus the external computer or embedded computer may be unable to perform work during at least a portion of this time. Also, as more VXI mainframes are daisy-chained together, and as more buses separate the device generating the read cycle and the memory servicing the read cycle, a greater amount of delay is imposed on a greater number of buses. Therefore, a method and apparatus is greatly desired which provides increased system performance and throughput for read cycles in instrumentation systems having a plurality of interconnected buses.

SUMMARY OF THE INVENTION

The present invention comprises a system and method for increasing the performance of read cycles in instrumentation systems having multiple interconnected buses. The present invention operates by converting read cycles into write cycles and taking advantage of the write posting and buffering capabilities of the bus interface logic within the instrumentation system. Thus the performance of read operations is greatly improved over prior art designs.

When a device referred to as a requestor desires to initiate a read cycle of memory, the device first creates a data transfer packet in its local memory. The data transfer packet contains the source beginning address, the destination beginning address, a count of the number of bytes involved in the transfer, acknowledge information, and other information relevant to the transfer. The requestor then writes the address of this data transfer packet to direct memory access (DMA) logic having DMA read/write conversion capabilities according to the present invention, whereby the DMA logic is situated near the memory desired to be read. If the memory desired to be read is situated on a device that includes DMA read/write conversion capabilities, then the requestor preferably writes to the respective device. The requestor writes this address to a specified address space of the DMA device, and the DMA device decodes a write to this address space as a command to perform read/write conversions according to the present invention.

The DMA device uses the 32 bit address provided from the requestor to obtain the data transfer packet comprising the information relevant to the transfer. The DMA device then initiates write cycles to the requestor to perform the desired transfer. Since each bus interface logic bridge includes write posting capability and first-in first-out buffers, the write operation can be performed much more efficiently than a read operation. As intermediate bus interface devices between the memory and the requestor receive the write data, the devices latch the write data into their respective FIFO buffer and immediately return ready signals, thus freeing up the bus quickly for other uses. Also, during these write cycles a respective bus is not required to be in use until the write data propagates to the respective bus. Thus, the write posting capability requires that only one bus be tied up at a given time, and thus the data transfer is performed much more efficiently.

In a first embodiment of the invention, the system includes an external computer used to control VXI instruments in one or more VXI mainframes which are interconnected by MXI bus cables. The expansion/MXI bridge in the external computer and all of the VXI-MXI extenders in the respective VXI mainframes preferably include DMA read/write conversion logic for converting read cycles into write cycles according to the present invention. One or more VXI instruments may also include DMA read/write conversion logic according to the present invention. The expansion/MXI bridge and the VXI-MXI extenders also each include a FIFO buffer and write posting capability.

In a second embodiment, the system includes one or more interconnected VXI mainframes, wherein at least one of the VXI mainframes includes an embedded computer. In this embodiment, the VXI-MXI extenders in the respective VXI mainframes preferably include DMA read/write conversion logic for converting read cycles into write cycles according to the present invention. One or more VXI instruments may also include DMA read/write conversion logic according to the present invention. The VXI-MXI extenders also each include a FIFO buffer and write posting capability. In another embodiment, the system includes an embedded computer and instruments in a single mainframe.

A system according to the preferred embodiment performs read/write conversions on read cycles propagating in either direction. For example, if a VXI instrument desires to read data from the external computer, the VXI instrument first sets up a data transfer packet and writes the address of this packet to a specified address space of a DMA device including read/write conversion logic according to the present invention that is close to the memory from which data is requested, for example, the expansion/MXI bridge. The DMA device decodes the address of the write and determines that a read/write conversion has been requested. The DMA device then obtains the necessary information for the transfer from the data transfer packet and places this information in its transfer request queue. When this entry arrives at the head of the transfer request queue, the DMA device reads the requested data from memory and generates write cycles to transfer the data to the requesting device. In other words, the DMA device uses its DMA (direct memory access) capability to transfer the data from the memory to the requesting device using write cycles. The buffering and write posting capabilities of each of the expansion/MXI bridges in the system greatly increase the speed and efficiency of the transfer.

Similar operations occur for transfers in the opposite direction, i.e., if the external computer or embedded computer desires to read data from a VXI instrument in a VXI mainframe, the computer first sets up a data transfer packet and then writes to the DMA device or VXI-MXI extender closest to the VXI instrument desired to be accessed. The DMA device receives the write cycle to the specified address space, reads the packet set up by the external computer and performs the transfer using write cycles.

The DMA read/write conversion method of the present invention also provides performance benefits for intramainframe transfers because of the deep write posting buffers and FIFO buffers comprised within each VXI instrument and/or VXI-MXI extender. Thus, if a first VXI instrument in a VXI mainframe desires to read data from a second VXI instrument in the same VXI mainframe, and if the second VXI instrument or VXI mainframe includes DMA read/write conversion capabilities, the first instrument creates a data transfer packet and writes the address of this packet to the DMA device. The DMA device then performs the transfer using write cycles. The deep write posting buffers and FIFOs in the first VXI instrument provide performance benefits over a traditional read cycle. In addition, many VXI mainframes include a register based VXI device, referred to as a register based servant, that does not include a local processor. This register based servant has an associated commander device, i.e., another device in the mainframe that includes a local processor which performs various activities for the register based servant. According to the present invention, the commander of a register based servant detects when the register based servant desires to perform a read cycle of memory, creates the data transfer packet, and writes the address of the packet to the respective DMA device to institute a DMA read/write conversion according to the present invention. In such cases, the commander takes the form of a requestor on behalf of servant devices.

Therefore, a system and method for increasing the performance of read cycles in systems having multiple interconnected buses is disclosed. A requestor that desires to read memory situated on the same or a remote bus first creates a packet containing the necessary transfer information and then writes the address of this data transfer packet to a specified address space in the DMA device closest to the memory desired to be accessed. The DMA device decodes the write, obtains the necessary transfer information, and performs the transfer using DMA write cycles. Thus the DMA device essentially converts the read cycles into write cycles to transfer the requested data. The write cycles take advantage of the write posting and buffering capabilities of the various bus interface devices between the memory and the requesting device, thus providing much greater performance than the corresponding read cycles.

BRIEF DESCRIPTION OF THE DRAWINGS

A better understanding of the present invention can be obtained when the following detailed description of the preferred embodiment is considered in conjunction with the flowing drawings, in which.

DETAILED DESCRIPTION OF THE PREFERRED EMBODIMENT

Figure 1:
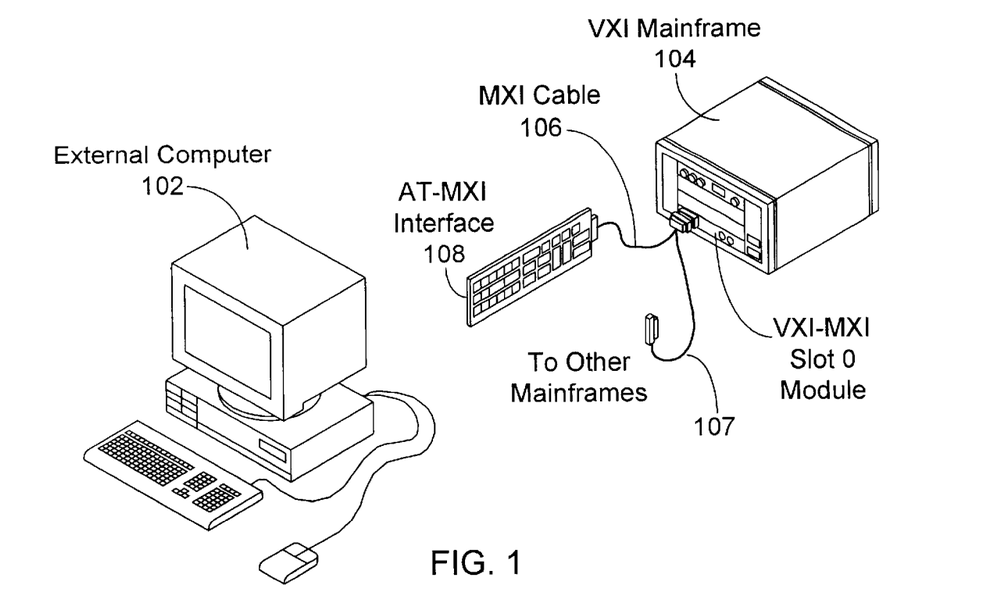
FIG. 1 illustrates an instrumentation system controlled by an external computer.

Instrumentation System—FIG. 1

Referring now to FIG. 1, an instrumentation system incorporating the system and method of the present invention is shown. As previously discussed, the present invention is preferably incorporated into an instrumentation system, such as a VXI instrumentation system. The present invention may also be incorporated into VME-based systems. Further, it is noted that the present invention may be incorporated into other systems including one or more connected buses, as desired.

The instrumentation system shown in FIG. 1 includes an external computer 102 preferably comprising a system unit, monitor, keyboard, and mouse, as shown. In the embodiment shown in FIG. 1, the external computer 102 includes an expansion bus, preferably based on the industry standard architecture (ISA), also referred to as the AT bus. It is noted that other expansion buses may be used as desired. The external computer 102 includes an interface card referred to as the AT-MXI interface card 108 (shown outside of the external computer for illustrative purposes) which interfaces between the expansion bus in the external computer 102 and a MXI bus cable 106. The AT-MXI interface card 108 translates between AT bus signals in the external computer 102 and MXI bus signals in the MXI cable 106. The external computer 102 is coupled to a VXI mainframe 104 through the MXI cable 106.

The VXI mainframe 104 includes a first VXI-MXI extender card (230 FIG. 3A) which receives MXI signals from the MXI cable 106 and translates these signals into VXI signals which are supplied to the VXI backplane or bus built into the VXI mainframe 104. A plurality of VXI instruments are preferably comprised within the VXI mainframe 104 connected to the VXI backplane. Therefore, the external computer 102 controls VXI instruments in the VXI mainframe 104 by generating signals across the expansion bus through the AT-MXI interface 108, the MXI cable 106, and to the VXI-MXI extender inside the VXI mainframe 104. The VXI-MXI extender converts the respective signals into VXI signals, which are then used to control the VXI instruments. The VXI mainframe 104 may also include a second VXI-MXI extender (230A FIG. 3A) which connects to a second MXI cable 107 that is used for connecting to other VXI mainframes as shown. In this manner, a plurality of VXI mainframes 104 can be daisy-chained together to allow the external computer 102 to control a greater number of VXI instruments.

Figure 2:
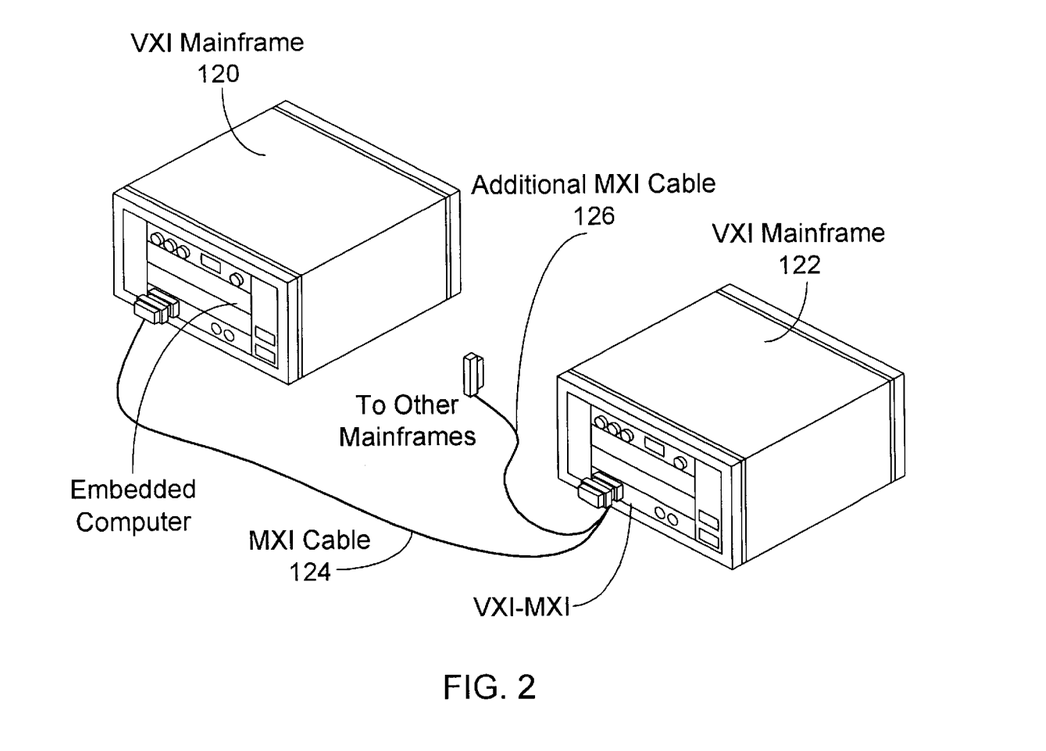
FIG. 2 illustrates an instrumentation system comprising two VXI mainframes controlled by an embedded CPU.

Instrumentation System—FIG. 2

Referring now to FIG. 2, an alternate embodiment which implements the system and method of the present invention is shown. In the system shown in FIG. 2, an external computer is not used to control the instrumentation system, but rather a first VXI mainframe 120 includes an embedded computer which controls VXI instruments in the first VXI mainframe 120 and also controls VXI instruments in a second VXI mainframe 122. The first VXI mainframe 120 includes a VXI-MXI extender (230A FIG. 3B) which translates VXI signals into MXI signals that are transferred over MXI cable 124 to the second VXI mainframe 122. The second VXI mainframe 122 includes a VXI-MXI extender (230B FIG. 3B) which translates the MXI signals into VXI signals that are provided over the VXI backplane to control the respective VXI instruments in the second VXI mainframe 122. In this manner, the embedded computer inside the first VXI mainframe 120 controls VXI instruments in both the first and second VXI mainframes 120 and 122. Also, the second VXI mainframe 122 may include a second VXI-MXI extender (not shown) which connects to an additional MXI cable 126 that can connect to a third VXI mainframe (not shown) as desired. In this manner, a plurality of VXI mainframes can be daisy-chained together to allow the embedded computer in the first VXI mainframe 120 to control a greater number of VXI instruments.

The present invention may also be included in a system which includes only a single VXI mainframe. Further, the present invention may be included in a system which includes two or more external or embedded computers. Also, the present invention may be used in a system comprising two computers linked by a MXI cable. Further the present invention may be used in VME-based systems, as well as others. Thus the present invention may be included in various types of VXI configurations and other bus type configurations, as would be apparent to one skilled in the art.

Figure 3A:
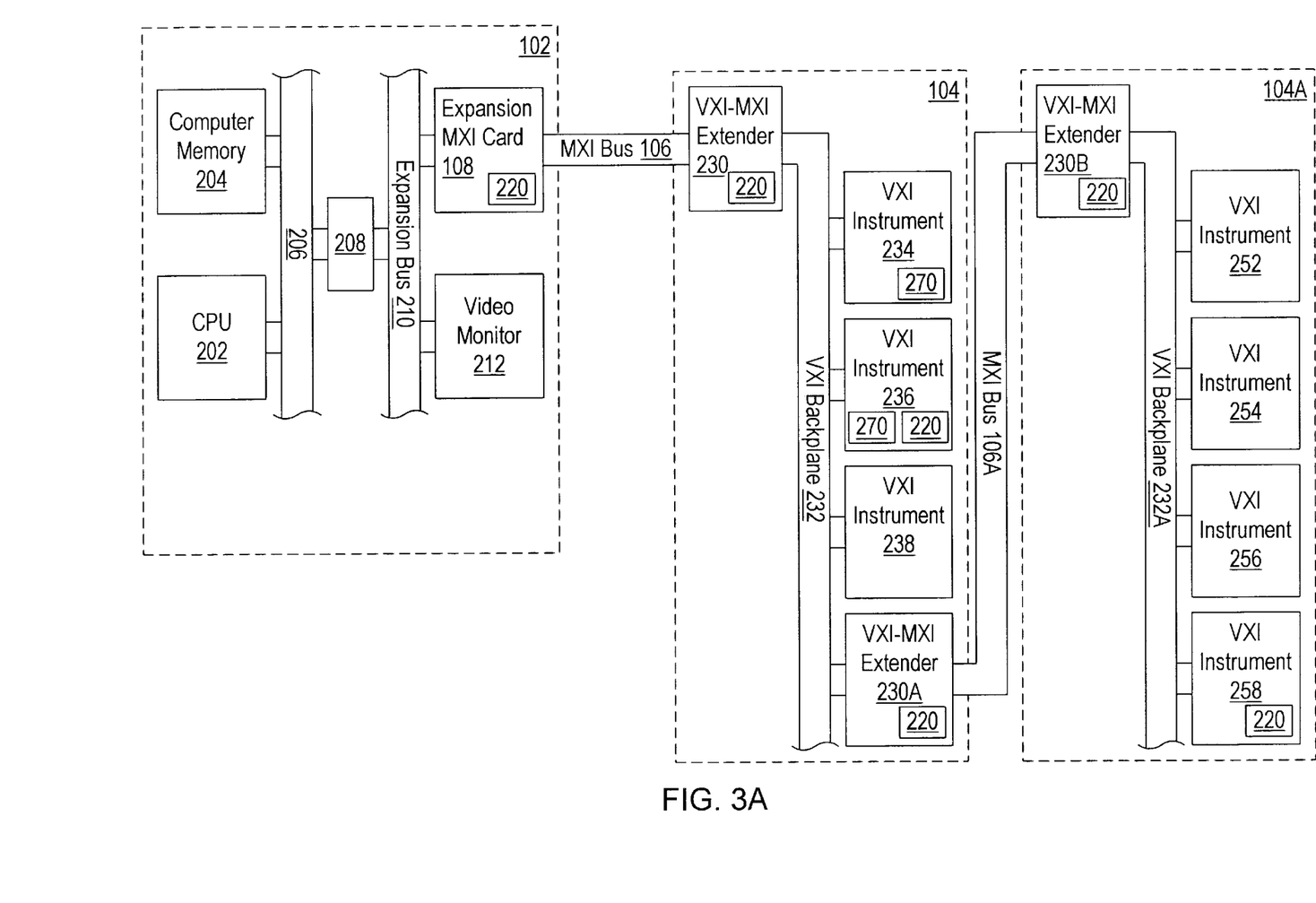
FIG. 3A is a block diagram of the instrumentation system of FIG. 1.

Block Diagram—FIG. 3A

Referring now to FIG. 3A, a block diagram illustrating the components comprising the instrumentation system in FIG. 1 is shown. As shown, the external computer 102 includes a CPU 202 and computer memory 204 connected to a system bus 206. The system bus 206 is connected through a bus interface 208 to an expansion bus 210. The expansion bus 210 can be based on any of the various types of bus standards, including the PCI (Peripheral Component Interconnect) bus, the Industry Standard Architecture (ISA), referred to as the AT bus, the Extended Industry Standard Architecture (EISA), MicroChannel Architecture (MCA), and the NuBus, as well as others. A video monitor 212 is coupled to the expansion bus 210. The expansion/MXI card 108 is preferably coupled to the expansion bus 210. As discussed above with regard to FIG. 1, the expansion bus used in the embodiment in FIG. 1 is the AT bus, and the expansion/MXI card is the AT-MXI interface card 108. As shown, the expansion/MXI interface card 108 includes direct memory access (DMA) transfer logic 220 which includes read/write conversion logic according to the present invention.

The expansion/MXI card 108 couples through the MXI bus over a MXI cable 106 to a VXI-MXI extender 230. The VXI-MXI extender 230 is coupled to a VXI backplane 232. A plurality of VXI instruments 234, 236, and 238 are preferably coupled to the VXI backplane as shown. The VXI-MXI extender 230 translates MXI signals received from the MXI bus 106 into VXI signals that are provided over the VXI backplane 232 and vice-versa. The VXI-MXI extender 230 preferably includes DMA transfer logic 220 according to the present invention, which is similar to the DMA transfer logic 220 in the expansion/MXI card 108. One or more of these VXI instruments, such as the VXI instrument 236, may also include DMA read/write conversion logic 220 according to the present invention. As discussed above, this logic 220 is used in converting read cycles into write cycles to improve system efficiency according to the present invention.

In one embodiment of the invention, the VXI mainframe 104 includes a second VXI-MXI extender 230A which couples through a second MXI cable 106A to a second VXI mainframe 104A. The second VXI mainframe 104A includes a third VXI-MXI extender 230B which connects to the MXI bus 106A. The VXI-MXI extender 230B connects to a VXI backplane 232A. A plurality of VXI instruments 252, 254, 256, and 258 are connected to the VXI backplane 232A. The third VXI-MXI extender 230B preferably includes DMA read/write conversion logic 220 according to the present invention. One or more of the VXI instruments 252-258, such as the instrument 258, also include DMA read/write conversion logic 220 according to the present invention. It is noted that further VXI mainframes can be connected in this fashion, as desired.

One or more of the VXI instruments 234, 236, 238, 252, 254, 256, and 258, or their commanders, include logic 270 according to the present invention for requesting a read/write conversion from a DMA device 220 when a read operation is required. As discussed further below, when the respective VXI instrument desires to read data from memory the logic 270 generates a data transfer packet comprising information regarding the transfer. The logic 270 then writes the address of this data transfer packet to a specified address space of a target DMA device 220 to initiate a read/write conversion according to the present invention.

The DMA read/write conversion logic 220 and the logic 270 preferably comprise digital circuitry. However, the DMA read/write conversion logic 220 and the logic 270 may comprise any of various types of digital or analog logic, and may be implemented by a programmable microcontroller, as desired.

Figure 3B:
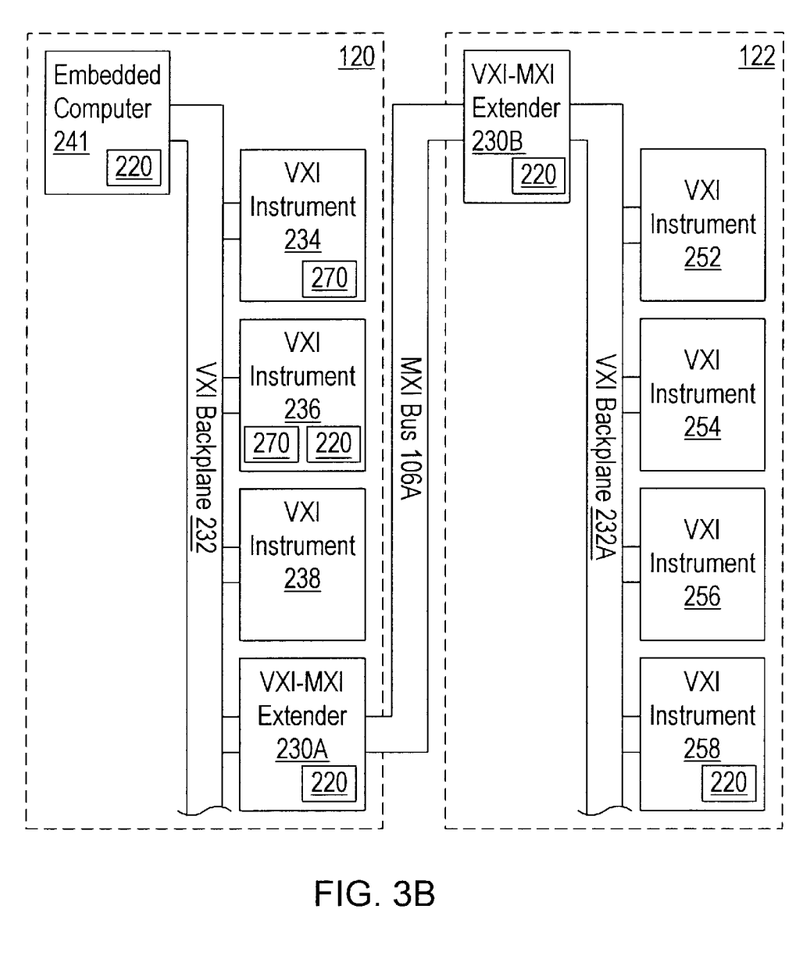
FIG. 3B is a block diagram of the instrumentation system of FIG. 2.

Block Diagram—FIG. 3B

Referring now to FIG. 3B, a block diagram illustrating the components in the instrumentation system of FIG. 2 is shown. In this embodiment of the invention, the VXI mainframe 120 includes a VXI-MXI extender 230A which couples through a MXI cable 106A to the second VXI mainframe 122. The second VXI mainframe 122 includes a VXI-MXI extender 230B which connects to the MXI bus 106A. The VXI-MXI extender 230B connects to a VXI backplane 232A. A plurality of VXI instruments 252, 254, 256, and 258 are connected to the VXI backplane 232A. The VXI-MXI extender 230B preferably includes DMA read/write conversion logic 220 according to the present invention. One or more of the VXI instruments 252–258, such as the instrument 258, also include DMA read/write conversion logic 220 according to the present invention. It is noted that further VXI mainframes can be connected in this fashion, as desired.

One or more of the VXI instruments 234, 236, 238, 252, 254, 256, and 258 include logic 270 according to the present invention for requesting a read/write conversion from a DMA device 220 when a read operation is required. As discussed further below, when the respective VXI instrument desires to read data from memory in another device, the logic 270 generates a data transfer packet comprising information regarding the transfer. The logic 270 then writes the address of this data transfer packet to a specified address space of a target DMA device 220 to initiate a read/write conversion according to the present invention.

Therefore, as shown, this system is similar to FIG. 3A, but includes an embedded computer 241 instead of external computer 102. The embedded computer 241 comprised in VXI mainframe 120 is coupled to a VXI backplane 232. A plurality of VXI instruments 234, 236, and 238 are preferably coupled to the VXI backplane 232 as shown. The embedded computer 241 preferably includes DMA transfer logic 220 according to the present invention. One or more of these VXI instruments, such as the VXI instrument 236, may also include DMA read/write conversion logic 220 according to the present invention. As discussed above, this logic is used in converting read cycles into write cycles to improve system efficiency according to the present invention.

In one embodiment of the invention, the system only includes the single VXI mainframe 120. Also, as noted above, the DMA read/write conversion logic 220 and the logic 270 may comprise any of various types of digital or analog logic, or programmable logic, as desired.

Figure 4:
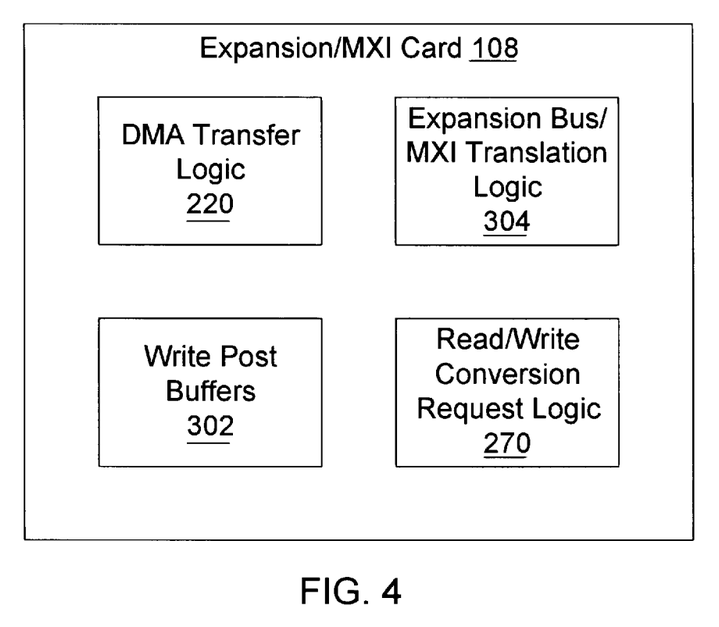
FIG. 4 is a block diagram of the expansion/MXI card in the block diagram of FIG. 3A.

FIG. 4—Expansion/MXI Card

Referring now to FIG. 4, a block diagram illustrating elements comprised in the expansion/MXI card 108 is shown. As shown, the expansion/MXI card 108 includes the DMA transfer logic 220 as well as write post buffers 302 and expansion/MXI translation logic 304. The expansion/MXI card 108 also includes logic 270 according to the present invention for requesting a read/write conversion from a DMA device 220 when a read operation is required. As discussed above, the DMA transfer logic 220 performs data transfers and converts read cycles into write cycles according to the present invention. The write post buffers 302 include a FIFO buffer and are used for posting write cycles, i.e., returning a ready signal to the sending device when the data has been latched into the write post buffers to relinquish control of the respective bus. The expansion/MXI translation logic 304 converts signals between the expansion bus 210 and the MXI bus 106.

Figure 5:
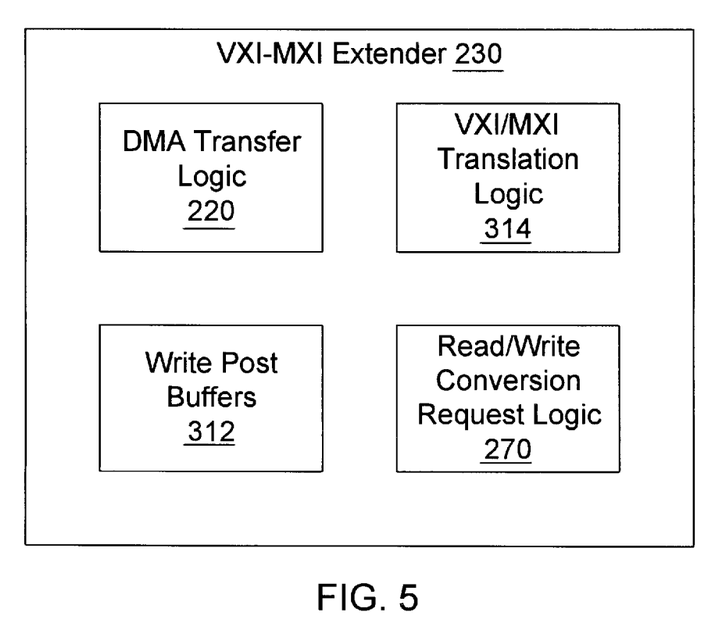
FIG. 5 is a block diagram of the VXI-MXI extender in the block diagram of FIG. 3A.

FIG. 5—VXI-MXI Extenders

Referring now to FIG. 5, a block diagram illustrating the components in each of the VXI-MXI extenders 230, 230A, and 230B are shown. In the preferred embodiment, the VXI-MXI extenders 230, 230A, and 230B are identical. As shown, each VXI-MXI extender includes DMA transfer logic 220, write post buffers 302, VXI-MXI translation logic 314, and the logic 270. As discussed above, the DMA transfer logic 220 performs data transfers and converts read cycles into write cycles according to the present invention, and the write post buffers 302 are used for posting write cycles.

In the following description, the present invention is described with regard to the system of FIGS. 1 and 3A. However, it is noted that the following description applies equally well to the system shown in FIGS. 2 and 3B, as well as other VXI or VME instrumentation systems, as well as other systems.

Referring again to FIGS. 1 and 3A, in the preferred embodiment, direct memory access (DMA) transfer logic 220 according to the present invention is included on the AT-MXI interface card 108, one or more of the VXI-MXI extenders 230, 230A, and 230B in the VXI mainframes 104 and 104A, and one or more of the VXI instruments such as instruments 236 and 258. This logic operates to convert read cycles into write cycles to increase system efficiency. According to the prior art, if a VXI instrument in the VXI mainframe 104 desired to read data from memory inside the external computer 102, the VXI instrument would first have to arbitrate for control of the VXI backplane in the VXI mainframe 104. When the VXI instrument gained control of the VXI backplane, the VXI-MXI extender would then be required to arbitrate for control of the MXI bus on the MXI cable 106. When this arbitration completed, the AT-MXI interface card 108 would then arbitrate for the respective bus in the external computer 102 where the memory storing the data desired to be read is located. Once all of the various bus arbitrations completed, the VXI instrument would then operate to read the desired data from the memory in the external computer 102. All of the various buses, i.e., the VXI backplane 232, the MXI bus 106, and the computer expansion bus 210, would be tied up during this time and could not be used by other logic.

Likewise, when the CPU 202 or other device in the external computer 102 desired to read data from a VXI instrument situated in the VXI mainframe 104, the CPU 202 would be required to arbitrate for the expansion bus, the MXI bus 106 and the VXI backplane 232 until control of all of these buses has been obtained. Once control of all of the buses had been obtained, then the read operation could proceed.

If a large amount of data was being transferred in the read operation, which is very common in instrumentation systems, then these buses could not be used by other devices for a lengthy period of time. This is especially problematic if the read operation involves the external computer's memory bus because the memory bus and all the buses between this bus and the instrument are tied up during the entire read operation as the read data propagates from bus to bus until it reaches its destination, and thus the external computer may be unable to perform work during a portion of this time. Also, as more VXI mainframes are connected together, and as more buses separate the device generating the read cycle and the memory servicing the read cycle, a greater amount of delay is imposed on a greater number of buses, and further, each of these buses is tied up until data reaches its destination.

The present invention operates by converting read cycles into write cycles and taking advantage of the write posting and buffering capabilities of the bus interface logic situated between the devices involved in the data transfer. Using these write posting and buffering capabilities, only one bus is in use at a time during the write transfer. Thus system efficiency is greatly increased because the buses not being used during the transfer can be used for other purposes. If the read operation involves the memory bus of the external computer 102, then the memory bus is freed up once the data has been posted to the expansion bus. Likewise the expansion bus is freed up once the write data has been posted to the expansion/MXI card 108, and so on. In general, if a bus is not directly involved in a respective portion of the write transfer, the bus is free and can be used for other purposes. Further, as more VXI mainframes are daisy-chained together and more buses become involved in the transfer, the performance increase is magnified.

Figure 6:
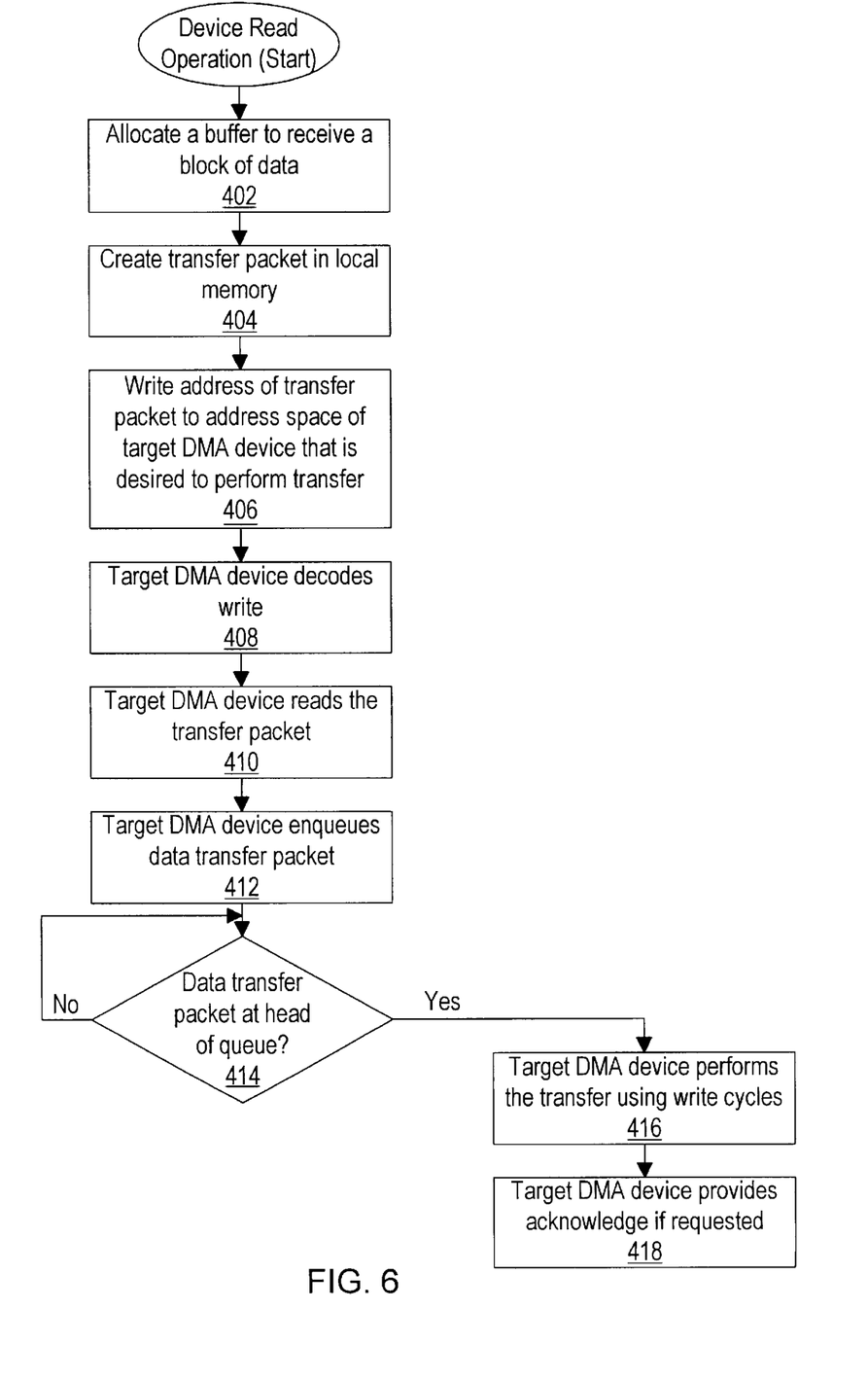
FIG. 6 is a flowchart diagram illustrating a device read operation using the read/write conversion method of the present invention.

FIG. 6—Flowchart Diagram

Referring now to FIG. 6, a flowchart diagram illustrating a read operation where a requestor, such as the VXI instrument 234, desires to read data from the computer memory 204 in the external computer 102 is shown. It is noted that any device capable of generating read cycles can act as a requestor, and the read/write conversion method of the present invention can operate on transfers in either direction.

When the VXI instrument 234 desires to initiate a read operation of memory in the external computer 102, in step 402 the VXI instrument 234 allocates a buffer to receive a block of data. In step 404, the VXI instrument 234 creates a data transfer packet in its local memory comprising the source beginning address, i.e., the beginning address of the data desired to be read, the destination beginning address, i.e., the beginning address of the buffer in the local memory of the VXI instrument 234 where the data is desired to be placed, a count of the number of bytes involved in the transfer, acknowledge information, and other transfer information. In the preferred embodiment, the VXI instrument 234 simply creates the data transfer packet in its own local memory. However, in other embodiments the VXI instrument writes this transfer packet to memory situated near the DMA transfer device 220 that will actually be performing the transfer.

Figure 8:
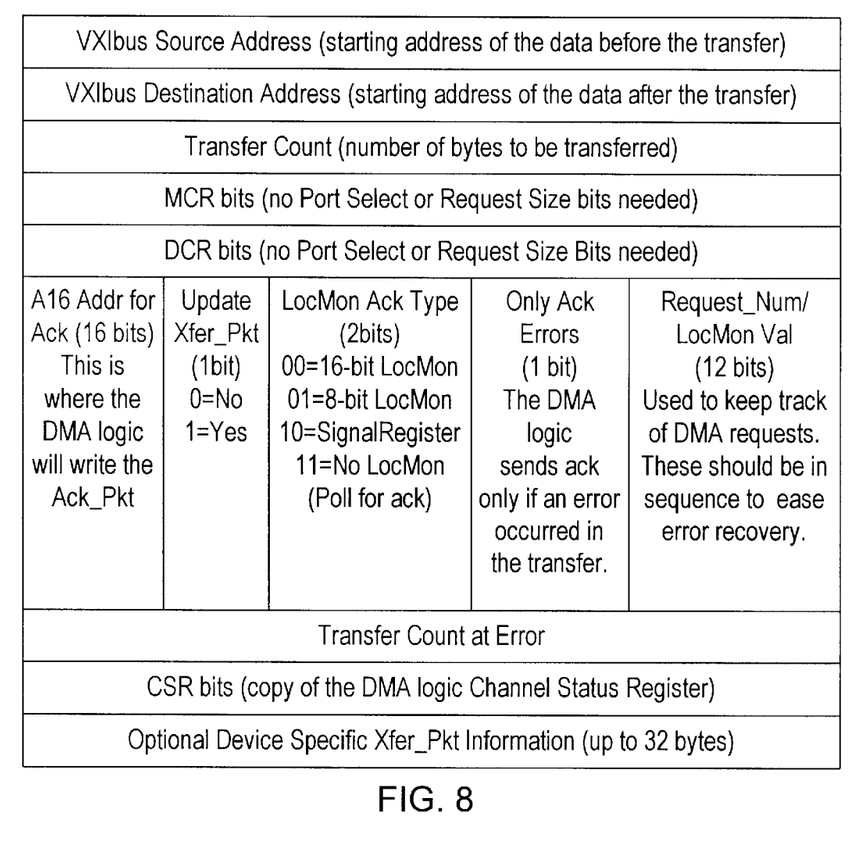
FIG. 8 illustrates a data transfer packet.

FIG. 8 illustrates a data transfer packet structure in the preferred embodiment. As shown, a data transfer packet comprises a 64-byte data structure. The first five words of the data transfer packet comprise information needed by the DMA device 220 to conduct the requested transfer. This includes the source address or the starting address of the requested data before the transfer, the destination address, i.e., the starting address of the destination where the data is desired to be transferred, and a transfer count indicating the number of bytes to be transferred. The fourth and fifth words of the data transfer packet comprise information to enable the DMA device to configure itself for the transfer. The sixth word of the data transfer packet informs the DMA device 220 the termination method and various parameters for the transfer protocol. For example, this word includes an A16 address which is a sixteen bit value that tells the DMA device 220 where to write an acknowledge packet. This word also includes an update packet bit which is set or cleared to indicate whether the DMA device 220 should update the data transfer packet as part of a transfer acknowledge completion to inform the requestor that the transfer has completed. The sixth word also includes two bits referred to as LocMonAck type indicating the location monitor acknowledge type. These bits are used when the requestor requests that a location monitor be used by the DMA device 220 to acknowledge completion of the transfer. As shown, the types of location monitor include value 00 for a 16-bit location monitor, value 01 for an 8-bit location monitor, value 10 for a signal register, or value 11 to indicate no location monitor if one is not requested. Thus the LocMonAck type bits are set to 11 if the requestor is polling for the acknowledge. The sixth word further includes a bit which is set to indicate that the DMA device 220 should only provide an acknowledge if an error occurred in the transfer. Finally, the sixth word in the data transfer packet includes 12 bits indicating a request number (Request_Num) and/or a location monitor value that are used to keep track of DMA requests. These values are preferably used in sequence to ease error recovery.

The seventh and eighth words of the data transfer packet, referred to as "Transfer Count at Error" and "CSR bits", are used by the DMA device 220 during protocol termination to report status information. The requestor can place any device-specific information after the 8th word. 32 bytes can be used for such information. An example of information which could be in this field of the data transfer packet is a Data Transfer Sequence Number for VME-based requestors which require an 8-bit location monitor interrupt.

Thus, if a requestor has requested a data transfer acknowledge, then when a DMA device 220 completes the transfer request, the DMA device 220 sends an acknowledge to the requestor informing the requestor that the request has been serviced. This acknowledge can include information regarding which request was serviced using the Request_Num if the requestor is on a device including DMA logic 220. The DMA device 220 also informs the requestor of any status and error information pertaining to the request. The DMA logic 220 can be directed to not send any acknowledge or to acknowledge only when an error occurs. Further, the DMA logic 220 can be directed to write the acknowledge to the data transfer packet if the requestor is going to poll for the acknowledge.

Figure 9:
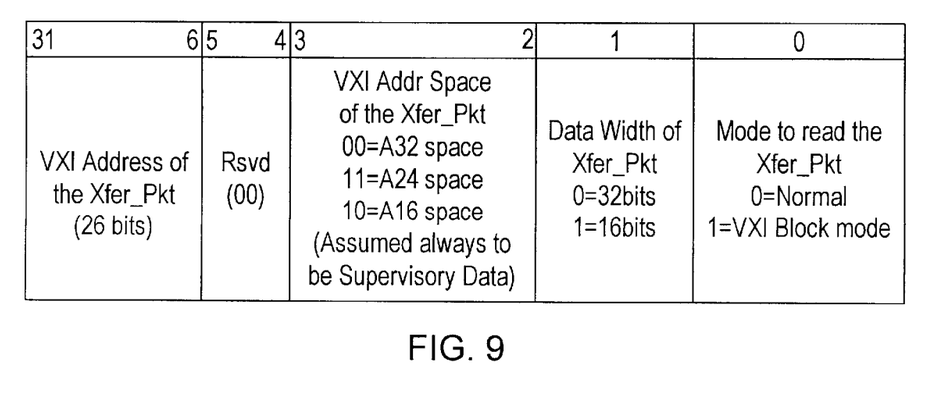
FIG. 9 illustrates a 32-bit value written by a requestor to DMA logic to initiate a DMA read/write conversion.

In step 406, the local processor in the VXI instrument 234 writes the address of the transfer packet to a specified address space of a target DMA device that is desired to perform the transfer. In the present example, the VXI instrument 234 writes the address of the transfer packet to a specified address space in the expansion/MXI card 108. However, if the memory being accessed resides on a card that includes DMA logic 220 of the present invention, then the VXI instrument 234 preferably writes to this card. Referring now to FIG. 9, the address of the respective data transfer packet written by a requestor to a target DMA device 220 is shown. This address includes the actual 26-bit address of the data transfer packet, as well as additional information. As shown, bits 31:6 comprise the 26-bit VXI address of the data transfer packet. Bits 5 and 4 are reserved. Bits 3 and 2 indicate the VXI address space of the data transfer packet. As shown, the value 00 indicates the A32 address space, the value 11 indicates the A24 address space and the value 10 indicates the A16 address space. Here it is assumed that the data is supervisory data. Bit 1 comprises the data width of the data transfer packet, whereby 0 equals a 32-bit data width and 1 equals a 16-bit data width. Bit 0 indicates the mode to read the data transfer packet. A value of 0 indicates a normal read and a value of 1 indicates a read using VXI block mode.

The target DMA logic 220 receives the 32-bit data transfer packet address, preferably in a FIFO register in its logical address space or upper A16 address space. The FIFO register is preferably an 8-deep FIFO register. In the preferred embodiment, the DMA logic 220 includes two DMA channels. During power-up, one of the DMA channels is preferably programmed in a "read/write conversion" mode to perform read/write conversions according to the present invention. Thus, at power-up one channel is programmed in read/write conversion mode to perform these transfers and is also provided with a designated address space that a requestor writes to in order to initiate read/write conversions according to the present invention. In the preferred embodiment, either of the two channels can be programmed in this mode, but if neither of the DMA channels is programmed in "read/write conversion" mode, then a write to the respective data transfer packet address register results in a bus error. If the respective address FIFO register is full, then the DMA logic 220 returns a retry to the requestor, and the requestor then resends the address of the data transfer packet.

In step 408 the DMA device 220 decodes the write operation to the specified address space and determines that a read/write conversion according to the present invention has been requested. As discussed above, a write to a predetermined address space of the DMA device 220 instructs the DMA device 220 that a read/write conversion is desired. It is noted that in alternate embodiments other methods may be used to inform the DMA logic 220 that a read/write conversion is requested, such as a dedicated signal line or a specified data value. In step 410 the target DMA device 220 reads the contents of the data transfer packet, which is preferably in the local memory of the VXI instrument 234, to determine where the requested data resides and where the requested data is to be transferred. The DMA device 220 also determines the type of acknowledge requested, among other information. In the preferred embodiment, upon receiving a 32-bit address of a respective data transfer packet, the DMA logic 220 reads the first six words or 24 bytes of the data transfer packet. As discussed above, the first five words comprise information needed by the DMA logic 220 to conduct the requested transfer. The sixth word informs the DMA logic 220 of the requested termination method and parameters for the protocol of the transfer. In step 412 the DMA device 220 enqueues the data transfer packet on its transfer queue. When this data transfer packet reaches the head of the transfer queue in step 414, then in step 416 the DMA device 220 performs the transfer by reading the requested data from memory and then generating write cycles to transfer the data to the VXI instrument. It is noted that multiple read/write conversion transfer requests from multiple requestors can be placed on the queue, and these requests are serviced by the DMA logic 220 in the order they were received, or a priority scheme may be implemented for queueing the requests.

Figure 10:
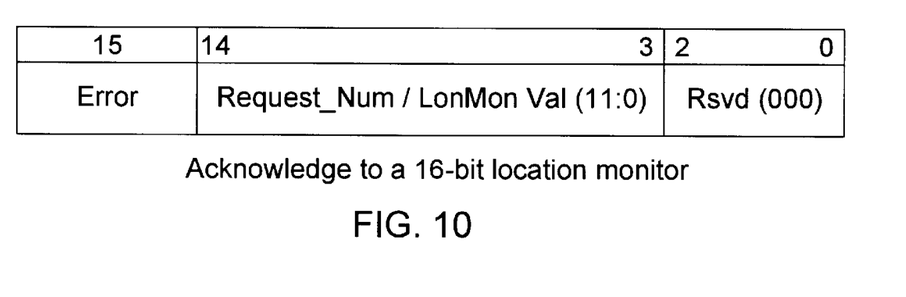
FIG. 10 illustrates the form of an acknowledge to a 16-bit location monitor on a requestor.
Figure 12:
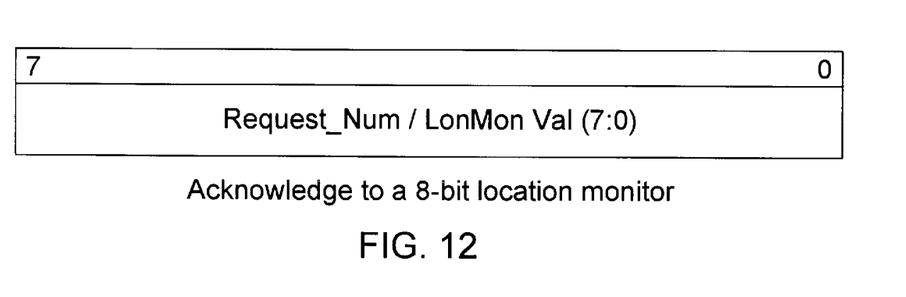
FIG. 12 illustrates the form of an acknowledge to an 8-bit location monitor on a requestor.

In step 418 the DMA device 220 provides an acknowledgement to the requestor if such an acknowledge was requested by the requestor in the respective data transfer packet. As discussed above, the DMA device 220 can be directed to not send any acknowledge or to provide an acknowledge only when an error occurs. Further, the DMA device 220 can be directed to write the acknowledge to the data transfer packet if the requestor is going to poll the data transfer packet for the acknowledge. If the DMA device 220 was directed to update the data transfer packet with an acknowledge, then the DONE bit in the CSR register is sent as part of the acknowledge to inform the requestor that the transfer is finished. The CSR copy is therefore the last word of the acknowledge if polling is used. If the acknowledge is provided to a location monitor register on a requestor including DMA logic 220, then the DMA logic 220 writes the Request_Num value, ie., the number of the request, and sets a bit to indicate the presence of any error as shown in FIG. 10. If the acknowledge is provided to a location monitor register in a device that does not include DMA logic 220, then 16-bit and 8-bit formats shown in FIGS. 10 and 12 are used. When the DMA logic 220 completes the requested transfer and (optionally) sends the acknowledge to the requestor, whether via a location monitor or through polling of the DONE bit, the transfer connection is said to be terminated.

FIG. 10 illustrates the form of the acknowledge to a 16-bit location monitor. This acknowledge is used when the requestor includes DMA logic 220 or has a general purpose 16-bit location monitor.

Figure 11:
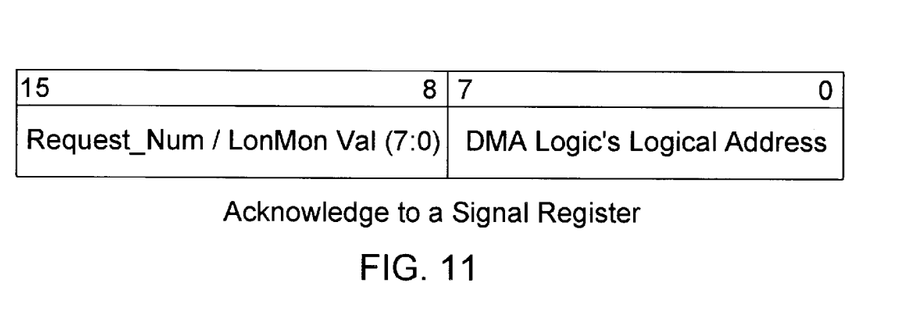
FIG. 11 illustrates the form of acknowledge to a requestor that includes a signal register and does not include DMA logic.

FIG. 11 illustrates the form of the acknowledge to a VXI signal register. This acknowledge is used when the requestor does not have DMA logic 220, but has a signal register. The upper two bits of this acknowledge should always be 10*b*, which should be part of the data transfer packet (the data transfer packet should be formed with bits 15 and 14 equal to 10*b*). The error information is written into the data transfer packet by the DMA logic 220. This allows the local processor to perform tasks other than just polling for the DONE bit in the data transfer packet. When the signal interrupt is asserted, the local processor preferably scans the data transfer packet and determines status information for the transfer.

FIG. 12 illustrates the form of the acknowledge to an 8-bit location monitor. This is used for VME devices who are requestors. The function of the interrupt is again to allow the local processor to service other tasks rather than just poll for the DONE bit in the data transfer packet.

It is noted that a requestor which includes DMA logic 220 has the least overhead associated with the acknowledge. In case of an error, the DMA logic 220 sends a copy of its channel status register and the transfer count where the error happened. This information is used by the local processor on the requestor to perform error recovery.

When the requestor receives the acknowledge via a location monitor, the local processor is interrupted. If the location monitor is comprised in DMA logic 220, the local processor reads out a value from a register referred to as the Location Monitor Register (LMR). The error bit in the LMR is cleared when read. If the requestor does not include DMA logic 220, the local processor must get the status information from either a separate location monitor or the data transfer packet (the CSR copy). If the requestor does not use any location monitors, the local processor must poll the DONE bit in the CSR copy until it is a 1*b* before it can treat it as being valid status information. The local processor then deallocates or reuses the buffer it had allocated for use in the completed transfer, based on the Request_Num value. Otherwise the local processor may run out of memory.

Figure 7:
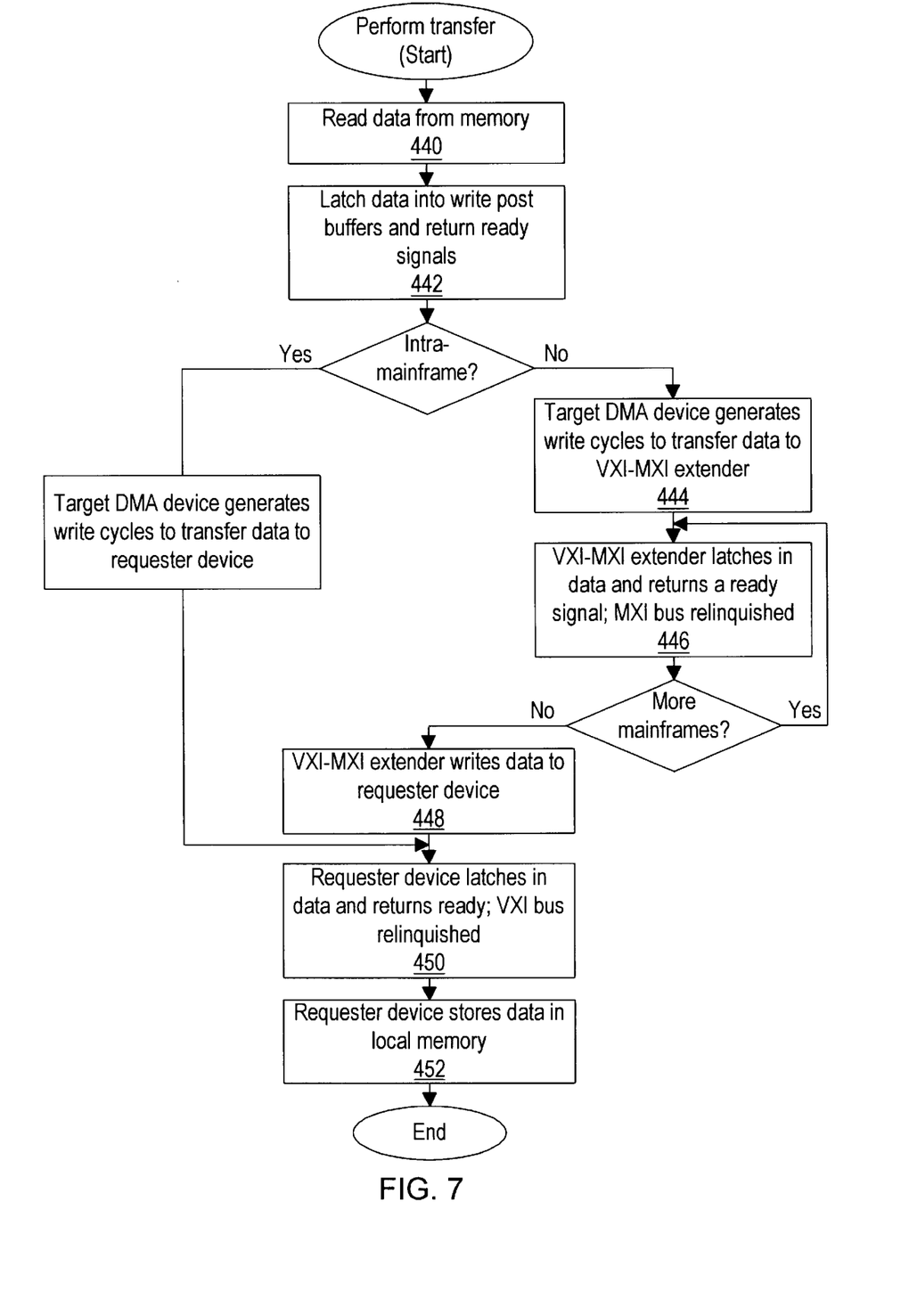
FIG. 7 is a flowchart diagram illustrating the data transfer performed in step 416 of FIG. 6.

FIG. 7—Flowchart Diagram

Referring now to FIG. 7, a more detailed block diagram illustrating step 416 of FIG. 6 is shown. In step 440 the DMA device 220 in the expansion/MXI card 108 reads the requested data from memory. It is noted that in this example the requested data may reside in the computer memory 204 or may reside in memory (not shown) situated on the expansion bus 210. In step 442 the expansion/MXI card 108 latches the data into its write post buffers and returns a ready signal to complete operations on the expansion bus. Once the data has been latched into the expansion/MXI card 108 and a ready signal has been returned, then the respective buses in the external computer 102 involved in this transfer are relinquished and can be used for other purposes. This provides a significant benefit over prior art methods using traditional read cycles, because read cycles would require that all these buses be tied up during the entire read cycle operation, i.e., these buses would be tied up until the data desired to be read has been transferred all the way to the requesting VXI instrument 234. In addition, the MXI bus 106 and VXI bus 232 may also be used for other purposes during the time these buses are not directly involved with this portion of the transfer.

In step 444 the DMA device 220 generates write cycles to transfer the data obtained in step 442 from memory to the VXI instrument 234. This involves generating an address strobe signal and the destination address of the VXI instrument 234 as well as placing the data out onto the MXI bus 106. Data is preferably transferred across the MXI bus using synchronous transfers. In step 446 the VXI-MXI extender 230 latches in the data from the MXI bus 106 and returns a ready signal to the expansion/MXI card 108. When the ready signal is received, the DMA device 220 in the expansion/MXI card 108 discontinues driving the data and relinquishes control of the MXI bus 106. Therefore, once the data has been transferred from the expansion/MXI card 108 to the VXI-MXI extender 230, the MXI bus is relinquished and can be used by devices for other purposes. In step 448 the VXI-MXI extender 230 generates write cycles to write the data to the VXI instrument 234. This involves generating the destination address and data onto the VXI backplane 232. It is noted that VXI bus signals can be used to extend synchronous transfers through the VXI backplane 232. In step 450 the VXI instrument 234 latches in the data output from the VXI-MXI extender 230 and returns a ready signal to the VXI-MXI extender 230. In response to the ready signal, the VXI-MXI extender 230 discontinues driving data on the VXI bus 232 and relinquishes control of the VXI bus 232.

In step 452 the VXI instrument 234 stores the received data in its local memory, i.e., transfers the received data from its write post buffers or latches to its local memory, and operation then completes.

It will be appreciated that as multiple VXI mainframes are daisy-chained together, the benefits of the present invention are multiplied. For example, if the device which desires to perform the read cycles is the VXI instrument 256 situated in the second VXI mainframe 104A, then the benefits of the present invention are increased due to the increased number of buses involved in the transfer. In other words, the conversion of read cycles into write cycles and the use of write posting capabilities frees up a greater number of buses in a shorter time as the data is transferred from bus to bus during the transfer.

It is also noted that the present invention is symmetrical in operation, i.e., read/write conversions can occur regardless of the direction of the transfer. Thus, if a device in the external computer 102, such as the CPU 202 or a device situated on the expansion bus 210 desires to perform a read operation of data in the local memory of a VXI instrument, such as the VXI instrument 234, then a read/write conversion is preferably used. Referring again to FIG. 6, in step 402 the requesting device in the external computer 102, such as the CPU 202, first allocates memory to receive a block of data. In step 404 the requestor CPU 202 creates a data transfer packet similar to that shown in FIG. 8, preferably in the computer memory 204. In step 406 the CPU 202 writes the address of the transfer packet to a designated address space in the DMA device 220 in the VXI-MXI extender 230. It is noted that, if the data is destined for the VXI instrument 236, then the CPU 202 preferably writes the address of the transfer packet to an address space of the DMA logic 220 in the VXI instrument 236. In this instance the DMA logic 220 in the VXI instrument 236 performs the DMA write cycles to transfer the requested data from the VXI instrument 236 to the computer memory 204. In step 408 the target DMA device 220 decodes the write operation and determines that a read/write conversion according to the present invention has been requested. In step 410 the DMA device 220 in the VXI-MXI extender 230 reads the data transfer packet from computer memory 204 and in step 412 enqueues this data transfer packet on its transfer queue. When this packet arrives at the head of the queue in step 414, then in step 416 the DMA logic 220 performs the transfer using write cycles. The write posting capability in the VXI-MXI extender 230 and the expansion/MXI card 108 allow the VXI bus 232, MXI bus 106, and external computer buses 210 and 206, to be freed up during a large portion of the transfer, which would not be possible if read cycles were used to obtain the data. As will be appreciated, even greater performance benefits are obtained if a VXI instrument in the second VXI mainframe 104A requests data from the external computer 102.

The DMA read/write conversion method of the present invention also provides performance benefits for intra-mainframe transfers because of the deep write posting buffers and FIFO buffers comprised within VXI instruments and/or VXI-MXI extenders and/or embedded computers. Thus, if a first VXI instrument in a VXI mainframe desires to read data from a second VXI instrument in the same VXI mainframe, and if the second VXI instrument or VXI mainframe includes DMA read/write conversion capabilities, the first instrument creates a data transfer packet and writes the address of this packet to the DMA device. The DMA device then performs the transfer using write cycles. The deep write posting buffers and FIFOs in the first VXI instrument provide performance benefits over a traditional read cycle.

In addition, many VXI mainframes include a register based VXI device, referred to as a register based servant, that does not include a local processor. This register based servant has an associated commander device, ie., another device in the mainframe that includes a local processor which performs various activities for the register based servant. According to the present invention, the commander of a register based servant detects when the register based servant desires to perform a read cycle of memory, creates the data transfer packet, and writes the address of the packet to the target DMA device to institute a DMA read/write conversion according to the present invention. It is noted that other processor-less devices may be handled similarly by the present invention.

The following table summarizes the sequence of operations performed by a requestor and DMA logic to conduct a DMA read/write conversion transfer according to the present invention:

| DMA logic | Requestor |
| --- | --- |
| | Set up Data Transfer Packet; |
| | While (Berr or Retry) |
| |   Send Transfer Packet Address to |
| |   DMA Logic; |
| |   /* if requestor is a 16-bit device, |
| |   it must lock the bus to send the |
| |   32-bit transfer packet address |
| Receive Transfer Packet Address | |
| into 8-deep FIFO; | |
| If (FIFO is Full) | |
|   Send Retry; | |
| Read Data Transfer Packet from | |
| Requestor; | |
| Enqueue Data Transfer Packet; | |
| Conduct the transfer | If (acknowledge requested) |
| |   While (Acknowledge not received) |
| |     Poll DONE bit or Wait for |
| |     Interrupt; |
| If Error ½ Send Ack) | |
|   Send ack to LocMon or to | If (acknowledge requested) |
|   Data Transfer Packet |   Handle the acknowledge |

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for performing data transfers in a system comprising first and second connected buses, wherein a memory is coupled to the first bus storing data, a direct memory access transfer device is coupled to the first bus, and a requestor device is coupled to the second bus which desires to obtain data from the memory coupled to the first bus, the method comprising:

(a) the requestor device initiating a read request to read data from the memory;

(b) creating a data transfer packet comprising information regarding a desired transfer of the data desired to be obtained from the memory;

(c) storing the packet in a memory
wherein (b) and (c) are performed in response to the requestor device initiating the read request;

(d) the direct memory access device reading said data transfer packet to obtain information regarding said desired data transfer;

(e) the direct memory access device configuring itself based on said data transfer packet, wherein the direct memory access device configures itself to transfer the data from the memory coupled to the first bus to the requestor device using write cycles; and (f) the direct memory access device transferring the data from the memory coupled to the first bus to the requestor device using write cycles in response to said configuring;

wherein (b)–(f) operate to perform a write transfer in response to the read request.

2. The method of claim 1, further comprising:

writing the address of said data transfer packet to the direct memory access transfer device after said storing and prior to the direct memory access device reading said data transfer packet;

wherein said writing the address comprises writing the address of said data transfer packet to a predetermined address space of the direct memory access device.

3. The method of claim 2, further comprising:

the direct memory access device decoding said write to said predetermined address space after said writing the address and prior to said reading said data transfer packet;

wherein the direct memory access device performs said reading and transferring if said address is in said predetermined address space.

4. The method of claim 1, wherein bus interface logic is coupled between said first and second buses, wherein said bus interface logic includes a write posting buffer, wherein said transferring comprises:

the direct memory access device writing data to said write posting buffer in the bus interface logic over the first bus;

the bus interface logic posting the write cycle, wherein said step of posting comprises latching in the write data and relinquishing control of the first bus.

5. The method of claim 4, wherein said transferring further comprises:

the bus interface logic transferring data using write cycles to the requestor device after said posting.

6. The method of claim 5, wherein said transferring further comprises:

the requestor device posting the write cycles from the bus interface logic after the bus interface logic transferring data to the requestor device, wherein the device posting the write cycles from the bus interface logic comprises the requestor device latching in the data and relinquishing control of the first bus.

7. The method of claim 1, wherein said data transfer packet comprises a source beginning address of where the data desired to be obtained is located in memory, a destination beginning address of where the device desires the data to be placed, and a count of the number of bytes of data involved in the transfer.

8. The method of claim 7, wherein said data transfer packet further comprises an indication of a desired acknowledgement from the direct memory access device after completion of said step of transferring.

9. The method of claim 1, wherein the first bus is a computer system bus and the second bus is a VXI bus;

wherein the requestor device is a VXI device.

10. The method of claim 1, wherein the first bus is a VXI bus and the second bus is a computer system bus;

wherein the requestor device is a computer system.

11. The method of claim 1, wherein the system further includes one or more third buses coupled between said first and second buses;

wherein said transferring comprises transferring the data from the memory to the requestor device over said first bus, said one or more third buses and said second bus.

12. The method of claim 11, wherein the first bus and the second bus are each one of a computer system bus and a VXI bus;

wherein said one or more third buses comprises at least one MXI bus.

13. The method of claim 1, wherein the first bus and second buses are VXI buses.

14. The method of claim 1, wherein the fist bus and second buses are computer system buses.

15. The method of claim 1, wherein the system further comprises a local direct memory access transfer device coupled to the first bus, wherein the local direct memory access transfer device receives the read request and performs (b) and (c) in response to the read request.

16. A system which performs more efficient data transfer operations, comprising:

a first bus;

a second bus;

bus interface logic coupled between said first bus and said second bus, wherein the bus interface logic includes a write posting buffer;

a memory coupled to the first bus storing data;

a first direct memory access transfer device coupled to the first bus;

a requestor device coupled to the second bus which is operable to initiate a read request to obtain data from the memory coupled to said first bus;

logic coupled to said requestor device which is operable to create and store a data transfer packet comprising information regarding a desired transfer of data from said memory, wherein said logic operates in response to said read request from the requestor device;

wherein said direct memory access device is operable to receive said address of said data transfer packet, read said data transfer packet to obtain information regarding said desired data transfer, configure said direct memory access device according to said information regarding said desired transfer in said data transfer packet, and transfer said data from the memory to the requestor device using write cycles;

wherein said direct memory access device transfers said desired data from the memory to the requestor device using write cycles in response to said read request.

17. The computer system of claim 16, wherein the requestor device is also operable to write an address of said data transfer packet to said direct memory access transfer device;

wherein the requestor device writes the address of said data transfer packet to a predetermined address space of said direct memory access device.

18. The computer system of claim 17, wherein said direct memory access device is further operable to decode said write to said predetermined address space;

wherein said direct memory access device operates to read said data transfer packet and transfer said data only if said write is to said predetermined address space.

19. The computer system of claim 16, wherein said direct memory access device operates to write said data to said write posting buffers in the bus interface logic over the first bus;

wherein the bus interface logic operates to post the write cycle, including latching in the write data in said write post buffer and relinquishing control of the first bus.

20. The computer system of claim 19, wherein said direct memory access device is operable to transfer said data from the memory to the requestor device using write cycles after the bus interface logic posts the write cycle.

21. The computer system of claim 16, wherein the second bus is a VXI bus.

22. The computer system of claim 16, wherein the first bus is one of a computer system bus or a MXI bus;

wherein the second bus is a VXI bus.

23. The computer system of claim 16, wherein said logic comprises a second direct memory access transfer device coupled to the second bus.

24. An instrumentation system which performs more efficient data transfer operations, comprising:

a first bus;

first bus interface logic coupled to said first bus which includes write posting buffers, a VXI bus;

second bus interface logic coupled between said first bus and said VXI bus which includes write posting buffers;

a memory coupled to the computer system bus storing data;

a direct memory access transfer device coupled to the computer system bus;

a requestor device coupled to the VXI bus which is operable to initiate a read request to obtain data from the memory coupled to said first bus;

logic coupled to said requestor device which is operable to create and store a data transfer packet comprising information regarding a desired transfer of data from said memory, wherein said logic operates in response to said read request from the requestor device;

wherein said direct memory access device is operable to receive said address of said data transfer packet, read said data transfer packet to obtain information regarding said desired data transfer, configure said direct memory access device according to said informational regarding said desired transfer in said data transfer packet, and transfer said data from the memory to the requestor device using write cycles;

wherein said direct memory access device transfers said desired data from the memory to the requestor device using write cycles in response to said read request.

25. An instrumentation system which performs more efficient data transfer operations, comprising:

a computer system including a computer system bus;

a MXI bus;

first bus interface logic coupled between said computer system bus and said MXI bus which includes write posting buffers, a VXI bus;

second bus interface logic coupled between said MXI bus and said VXI bus which includes write posting buffers;

a VXI instrument coupled to the VXI bus storing data;

a direct memory access transfer device coupled to the computer system bus;

wherein the computer system desires to read data from the memory comprised in said VXI instrument, wherein the computer system includes:

means for creating a data transfer packet comprising information regarding a desired transfer of data from said memory in said VXI instrument; and means for writing an address of said data transfer packet to said direct memory access transfer device;

wherein said direct memory access device comprises:

means for reading said data transfer packet to obtain information regarding said desired data transfer; and means for transferring said desired data from the memory in said VXI instrument to the computer system using write cycles;

wherein said direct memory access device transfers said desired data from the memory in said VXI instrument to the computer system using write cycles in response to the computer system desiring to read data from the memory comprised in said VXI instrument.

26. A method for performing data transfers in a system comprising first and second connected buses, wherein a memory is coupled to the first bus storing data, a direct memory access transfer device is coupled to the first bus, and a requestor device is coupled to the second bus which desires to obtain data from the memory coupled to the first bus, the method comprising:

the requestor device Initiating a read request to read data from the memory;

creating a data transfer packet comprising information regarding a desired transfer of the data desired to be obtained from the memory;

storing the packet in a memory;

writing the address of said data transfer packet to the direct memory access transfer device;

wherein said creating the data transfer packet, storing the packet in a memory, and writing the address of said data transfer packet to the direct memory access transfer device are performed in response to the requestor devise initiating the read request;

the direct memory access device reading said data transfer packet to obtain information regarding said desired data transfer;

the direct memory access device configuring itself based on said data transfer packet, wherein the direct memory access device configures itself to transfer the data from the memory coupled to the first bus to the requestor device using write cycles; and the direct memory access device transferring the data from the memory coupled to the first bus to the requestor device using write cycles in response to said configuring;

wherein said creating the data transfer packet, storing the packet in a memory, writing the address of said data transfer packet to the direct memory access transfer device, the direct memory access device reading said data transfer packet, the direct memory access device configuring itself, and the direct memory access device transferring the data using write cycles operates to convert the read request into a write transfer.

* * * * *

UNITED STATES PATENT AND TRADEMARK OFFICE
CERTIFICATE OF CORRECTION

PATENT NO. : 5,850,571
DATED : December 15, 1998
INVENTOR(S) : Odom et al.

It is certified that error appears in the above-identified patent and that said Letters Patent is hereby corrected as shown below:

In the claims:

Claim 24, col. 19, line 17, please delete "buffers," and substitute "buffers;" (a VXI bus; should be on a separate line).

Claim 26, col. 20, line 26, please delete "Initiating" and substitute (lower case).

Signed and Sealed this

Eighth Day of June, 1999

*Attest:*

Q. TODD DICKINSON

*Attesting Officer*   *Acting Commissioner of Patents and Trademarks*